United States Patent [19]

Ellis et al.

[11] 3,985,674

[45] Oct. 12, 1976

[54] STABILIZED SODIUM DITHIONITE SOLUTIONS

[75] Inventors: Leonard C. Ellis, Chesapeake; Mearl A. Kise, Portsmouth, both of Va.

[73] Assignee: Virginia Chemicals Inc., Portsmouth, Va.

[22] Filed: Dec. 10, 1974

[21] Appl. No.: 531,290

[52] U.S. Cl. .................................. 252/188; 8/110; 162/83; 423/515
[51] Int. Cl.² ...................... C01B 17/66; D21C 9/10
[58] Field of Search .................... 252/188; 423/515; 162/83; 8/110

[56] References Cited
UNITED STATES PATENTS

| | | | |
|---|---|---|---|
| 2,707,144 | 4/1955 | Sparrow et al. | 252/188 |
| 2,707,145 | 4/1955 | Sparrow et al. | 252/188 |
| 3,400,148 | 9/1968 | Quimby | 252/555 |
| 3,576,598 | 4/1971 | Plentovich et al. | 423/515 |
| 3,653,804 | 4/1972 | Janson et al. | 252/188 |
| 3,669,895 | 6/1972 | Shastri | 252/188 |
| 3,677,699 | 7/1972 | Fujiwara et al. | 252/188 |
| 3,819,807 | 6/1974 | Schreiner et al. | 252/188 |
| 3,887,695 | 6/1975 | Plentovich et al. | 423/515 |

*Primary Examiner*—Benjamin R. Padgett
*Assistant Examiner*—Irwin Gluck

[57] ABSTRACT

Sodium dithionite bleaching solutions for groundwood pulps which require no additional chemicals for pH adjustment prior to direct application to the pulps, based on zinc-derived or formate-derived sodium dithionite and containing small percentages of at least four additives selected from the following: a chelating agent, zinc dithionite, zinc sulfate, sodium carbonate, sodium hydroxide, sodium tripolyphosphate, sodium phosphate, and sodium metaborate. Tested chelating agents are nitrilotriacetic acid (NTA) trisodium salt and ethylenediaminetetraacetic acid (EDTA) tetrasodium salt. The solutions are cool-stable (50°F. or 10°C) for at least 5 days with less than 5% decomposition of the sodium dithionite, and several exhibit similar stability at storage temperatures of 70°–75°F. (21°–24°C.) A method of preparation of the solutions is also provided. Bleaching performance was proved in laboratory and field trials to be comparable to the performance of solutions prepared from dry, commercially available sodium dithionite blends or commercial zinc dithionite when compared on a basis of pounds of bleaching agent per ton of pulp per point brightness gain.

15 Claims, No Drawings

STABILIZED SODIUM DITHIONITE SOLUTIONS

BACKGROUND OF THE INVENTION

1. Field of the Invention

This invention relates to bleaching and especially to bleaching of groundwood pulps with dithionite-based compositions. More particularly, it relates to aqueous sodium dithionite solutions which are stabilized by additives and to methods for preparation thereof.

REVIEW OF THE PRIOR ART

High-yield wood pulps comprise groundwood pulps, either stone ground or refiner ground, and semichemical pulps. The former are respectively ground between stones or patterned steel disks without chemicals, and the latter are briefly softened by pressure cooking with chemicals before refiner grinding. These pulps are preferred for temporary usages requiring low strength, such as newsprint.

Groundwood pulps from certain woods, such as spruce, are often sufficiently bright for such uses without bleaching, but others need to be increased in brightness, particularly if semichemically cooked. Because groundwood pulps retain their original lignin content and because lignin darkens at a pH above 6.5, a lignin-preserving bleaching agent must be employed under acid conditions. Dithionites are highly suitable therefor.

Dithionites, commonly termed hydrosulfites or hyposulfites, have been used for years to bleach a wide variety of materials including straw, feathers, glue, textiles, and woodpulps. However, because dithionites are strong reducing agents, these problems have arisen:

1. when in powder form and exposed to moisture which is always abundant in paper mills, sodium dithionite has the potential to decompose rapidly and exothermically, evolving sufficient heat to ignite adjacent materials or by-product sulfur from the decomposition;
2. as stored solutions, dithionites decompose by reaction with oxygen and water under aerobic conditions to form bisulfite and bisulfate ions or decompose autooxidatively by reaction with water under anaerobic conditions to liberate bisulfite and thiosulfate ions, both decomposition routes creating acidity such that the decomposition proceeds rapidly to completion; and
3. during bleaching under acidic conditions, sodium dithionite solutions tend to decompose so rapidly that a considerable loss in bleaching effectiveness results.

For solving the first problem, various additives may be mixed with sodium dithionite powder, but they must not interfere with stability of the dithionite solutions or with bleaching efficiency. As disclosed in U.S. Pat. No. 3,669,895, water-soluble inorganic carbonates and sulfites and borax have been added to sodium dithionite to form a stabilized powder composition. Another stabilized powder composition, disclosed in U.S. Pat. No. 2,450,034, comprises sodium dithionite, anhydrous sodium carbonate, and sodium diethylenetriaminepenta-acetate.

Zinc dithionite is a preferred substitute for sodium dithionite, as taught in U.S. Pat. Nos. 984,312 and 2,450,034, because it is relatively stable under normal transport and storage conditions, is not spontaneously flammable when added to water, and is storable for up to three hours as a 10% solution, but its toxicity in effluent waters is ecologically undesirable. A radically different approach is taken by the process of U.S. Pat. No. 3,167,515 in which sodium dithionite is generated in situ by adding sodium metabisulfite and sodium borohydride to water. However, sodium dithionite solutions generated thereby have the same extremely short storage life as solutions prepared from commercial sodium dithionite, as it has been reported that they decompose at about 20% per hour at pH 6. The most popular commercial form of sodium borohydride being offered to the pulp bleaching industry contains approximately 42–44% sodium hydroxide, but the excess alkali must be neutralized because it is critical that the pH not exceed about 7 at any stage in the bleaching process in order to avoid a pronounced yellowing of the pulp.

Stabilizing sodium dithionite solutions by maintaining a highly alkaline pH therein, thereby neutralizing sulfite and sulfate ions as fast as they are formed, has long been practiced. Sufficient sodium phosphate is added to the straw bleaching process of U.S. Pat. No. 1,027,953, for example, to render the bath distinctly alkaline till the end of the bleaching treatment. In U.S. Pat. No. 3,804,944, sodium hydroxide (up to 20%) is added to sodium dithionite to bring the initial dissolving pH to the range of 9.0 to 13.0 for storage stabilization at temperatures of 35° F. to 135° F. According to U.S. Pat. No. 3,653,804, durability of a sodium dithionite solution is considerably enhanced by addition thereto of at least 5% by weight of sparingly soluble zinc compounds, including zinc oxide, zinc hydroxide, zinc carbonate, zinc basic carbonate, zinc basic silicate, and zinc basic phosphate. Significant stabilization during anaerobic preparation and storage of sodium dithionite solutions by addition of zinc sulfate at 2.0% to 11.3% by weight is taught in U.S. Pat. No. 3,672,829.

An important consideration is that decomposition of dithionite solutions is catalyzed by heavy metals, such as iron, and that groundwood pulps contain such metal ions as iron, manganese, copper, nickel, and cobalt, with iron predominating. A further consideration of interest is that commercial sodium dithionite, such as that produced from zinc metal or amalgam as taught in U.S. Pat. No. 3,536,445, contains various impurities, such as sodium chloride, sodium sulfate, sodium thiosulfate, and other salts, totalling up to 24%. Crystalline sodium dithionite is also produced by the process of U.S. Pat. No. 3,576,598 from $SO_2$ and sodium formate. The formate-derived sodium dithionite produces solutions having lower alkalinity than the zinc-derived solutions.

The prior art has long recognized that sodium dithionite solutions can be improved in stability and that bleaching efficiency can also be improved by sequestering these heavy metal ions. However, groundwood pulps themselves act as low-capacity ion-exchangers with a great affinity for heavy metal ions, less affinity for the alkaline earth metals, and very little affinity for the alkali metals, according to the Pulp and Paper Magazine of Canada, Technical Paper T174, pages 77–84, June 6, 1969. Although washing with water removes a large proportion of the alkali metals and washing with hydrochloric acid removes alkali and alkaline earth metals nearly completely but the heavy metals only partly, it requires a sequestering agent at a low pH for effectively deionizing groundwood pulps.

In U.S. Pat. No. 2,707,144, water-soluble phosphates, such as sodium pyrophosphate, sodium tetraphosphate, and sodium tripolyphosphate, are proposed for bleaching groundwood pulps. Sodium tripolyphosphate (STPP) is indeed the most commonly used complex forming agent at this time because of cost considerations.

Sodium citrate, with or without alkali tetraborate, is proposed in U.S. Pat. No. 2,826,478, and ethylenediaminetetraacetic acid, in amounts of 0.05% to 0.5% by weight, with or without water-soluble phosphates, is disclosed as a sequestering agent in U.S. Pat. No. 2,707,145. U.S. Pat. No. 3,709,779 suggests replacing STPP with sodium silicate as a sequestrant for enhancing bleaching efficiency.

Sodium dithionite-based bleaching compositions in powder form create problems in paper mills, textile plants, etc. (in addition to those caused by exothermic decomposition) because a powder is difficult to mix efficiently with a slurry. If a solution is preliminarily prepared in the paper mill, special equipment is needed, and personnel may be exposed to danger from $SO_2$ gas and heat created by rapid decomposition of sodium dithionite. It is consequently desirable to have a prepared bleaching solution delivered to the paper mill and pumped directly from a tank truck into a storage tank ready for use.

This delivery procedure, however, requires at least five days for mixing chemicals with water, loading the bleaching solution, delivery to the paper mill, and brief storage therein near the point of application. Such a bleaching solution ideally should have the following properties:

1. less than 3% decomposition after five days storage at 50° F.;
2. less than 25% total alkalinity as $Na_2CO_3$ (on a sodium hydrosulfite basis) with no special requirements for soda ash;
3. 2–4% soluble zinc (sodium hydrosulfite basis);
4. a solution pH of approximately 10;
5. substantially no precipitate or turbidity;
6. sequestering activity (as calcium carbonate) equivalent to 15% sodium tripolyphosphate; and
7. total solids of approximately 20% by weight. Preliminary storage tests were made at 70°–75° F. With 14 alkaline agents such as sodium carbonate, sodium tripolyphosphate, borax, sodium phosphate, sodium acetate, and sodium hydroxide in the presence of sodium dithionite at concentrations of 10% to 13%, and similar tests were made with 8 sequestrants and complexformers combined with sodium hydroxide. However, none provided the stability desired with exception of caustic soda, and it caused too much alkalinity for use on groundwood pulp because it is critical that the pH not exceed about 7 at any stage in the process after the addition of any of the bleaching chemicals, in order to avoid a pronounced yellowing of the pulp, so that the excess sodium hydroxide must be neutralized before contact is made with the pulp slurry.

Stability tests at various temperatures and concentrations were also made on aqueous solutions prepared from three commercially available bleaching compositions having the following dry-basis formulations shown in Table I:

TABLE I

| Composition | A | B | C |
|---|---|---|---|
| Sodium hydrosulfite (zinc-derived, 94% minimum assay) | 75.0% | | |
| Sodium Hydrosulfite, (Formate-derived - 89% Minimum Assay) | | 77.0% | 78.0% |
| Sodium Tripolyphosphate | 15.5% | 14.5% | 8.5% |
| Sodium Carbonate | 7.0% | 8.0% | 10.0% |
| Sodium Benzoate | 0.5% | 0.5% | |
| Zinc Hydrosulfite | 2.0% | | 1.0% |
| Nitrilotriacetic acid trisodium salt, monohydrate | | | 2.5% |

All solutions were stored under a protective layer of mineral oil in one-quart glass jars in order to maintain anaerobic conditions. All Composition A solutions contained a heavy white floc, apparently zinc carbonate, that was easily dispersed upon shaking. All Composition B solutions were clear with a slight yellow cast when initially dissolved. After storage for four days, the solutions were dark gray with some black floc precipitate. All Composition C solutions contained a slight floc. The stability characteristics of the Composition A solutions are given in Table II.

TABLE II

| Wt. % Blend | Wt % $Na_2S_2O_4$ | Storage Temp.,°F. | % Decomposition of $Na_2S_2O_4$ | | | | | | |
|---|---|---|---|---|---|---|---|---|---|
| | | | 4 Days | 6 Days | 8 Days | 10 Days | 11 Days | 12 Days | 14 Days |
| 18.56 | 13.0 | 70–75 | 1.6 | 9.1 | — | 86.2 | — | — | — |
| 18.56 | 13.0 | 45–50 | 0 | 0.6 | — | 1.0 | — | 1.6 | — |
| 18.56 | 13.0 | 32–35 | 0 | 0 | — | — | 0.2 | — | 0 |
| 14.29 | 10.0 | 70–75 | 0.3 | 1.9 | — | 33.3 | — | 78.6 | — |
| 14.29 | 10.0 | 45–50 | 0 | 0 | — | 0.3 | — | 1.0 | — |
| 14.29 | 10.0 | 32–35 | 0 | 0 | — | — | 0 | — | 0 |
| 7.14 | 5.0 | 70–75 | 0.9 | 1.4 | 1.5 | — | 0.2 | 0.4 | — |
| 7.14 | 5.0 | 45–50 | 4.0 | 2.5 | 1.6 | — | 1.6 | 2.6 | — |
| 7.14 | 5.0 | 32–35 | 4.1 | 1.7 | 0 | — | — | 0.8 | 0 |

The stability characteristics of Composition B solutions are given in Table III:

TABLE III

| Wt. % Composition B | Wt. % $Na_2S_2O_4$ | Storage Temp.°F. | % Decomposition of $Na_2S_2O_4$ | | | | | |
|---|---|---|---|---|---|---|---|---|
| | | | 4 Days | 6 Days | 10 Days | 11 Days | 12 Days | 14 Days |
| 18.57 | 13.0 | 70–75 | 84.8 | — | — | — | — | — |
| 18.57 | 13.0 | 45–50 | 22.0 | 58.4 | — | — | — | — |
| 18.57 | 13.0 | 32–35 | 1.7 | 5.0 | — | 19.2 | — | — |
| 14.29 | 10.0 | 70–75 | 71.2 | — | — | — | — | — |
| 14.29 | 10.0 | 45–50 | 10.7 | 27.7 | — | — | — | — |
| 14.29 | 10.0 | 32–35 | 2.3 | 4.6 | — | 10.6 | — | 16.3 |
| 7.14 | 5.0 | 70–75 | 17.4 | 36.9 | — | — | — | — |
| 7.14 | 5.0 | 45–50 | 2.2 | 6.1 | 9.6 | — | 22.0 | — |

TABLE III-continued

| Wt. % Composition B | Wt. % Na₂S₂O₄ | Storage Temp.°F. | % Decomposition of Na₂S₂O₄ | | | | | |
|---|---|---|---|---|---|---|---|---|
| | | | 4 Days | 6 Days | 10 Days | 11 Days | 12 Days | 14 Days |
| 7.14 | 5.0 | 32-35 | 0.4 | 1.7 | — | 1.9 | — | 5.3 |

The stability characteristics of the Composition C solutions are given in Table IV for a commercially useful concentration range:

TABLE IV

| Solution pH | Storage Temp., °F. | Initial Na₂S₂O₄ (%) | % Decomposition of Na₂S₂O₄ | | | |
|---|---|---|---|---|---|---|
| | | | 3 Days | 5 Days | 7 Days | 11 Days |
| 9.5 | 70-75° | 13.14% | 25.5 | — | 83.9 | — |
| 9.5 | 50° | 13.28% | 1.4 | 4.5 | 11.3 | 24.9 |
| 9.5 | 32° | 13.23% | 1.0 | 3.3 | 3.2 | 4.8 |

These tests demonstrate that commercially available compositions, although containing the ingredients known to be helpful for stabilizing sodium dithionite solutions, are not adequate because of floc formation, low temperature requirements, or low concentration requirements. A need evidently exists for stabilized sodium-dithionite solutions and for methods to prepare them.

Practical commercial limitations for stabilized sodium-dithionite bleaching solutions appear to comprise a content of at least 12% Na₂S₂O₄ by weight, 50° F. storability, 5% maximum decomposition after 5 days storage, and substantially no floc, fines, or turbidity.

SUMMARY OF THE INVENTION

It is accordingly an object of this invention to provide an aqueous sodium dithionite bleaching solution comprising a combination of additives so that no more than 5% of the dithionite decomposes after five days storage at 50° F. (10° C.) of a solution containing at least 13% Na₂S₂O₄.

It is another object to provide a method for preparation of this solution.

It is a further object to provide a bleaching solution that is substantially without floc, fines, or turbidity.

In accordance with these objectives and the spirit of this invention, stabilized sodium dithionite solutions are herein provided that have excellent stability with less than 5% decomposition during five days storage at 50° F. (10° C.), several also exhibiting similar stability at storage temperatures of 70°-75° F. (21°-24° C.). The solutions require no additional chemicals for pH adjustments prior to direct application to the pulps. The bleaching results are equal to those obtained from dry, proprietary sodium dithionite blends or commercial zinc dithionite when compared on a basis of pounds of bleaching agent per ton of pulp per point brightness gain.

In general, these stabilized solutions alternatively or additively comprise a chelating agent, a source of zinc ion, a complex former, and a source of hydroxyl ion in combined amounts discovered by methodical testing of individual additives, isolated and/or combined with other additives, to detect synergistic behavior and interactions involving ion-exchanging, chelating, and complex-forming.

Desirable storage and bleaching results are presented for solutions prepared from zinc-derived sodium dithionite as well as sodium formate-derived sodium dithionite using at least one additive selected from soda ash, sodium tripolyphoshate, nitrilotriacetic acid trisodium salt, zinc hydrosulfite, borax, sodium phosphate, and ethylenediaminetetraacetic acid tetrasodium salt.

Successful field trials have been concluded at five paper mills in South Carolina, Oregon, and Washington. On a five-day run in one western paper mill, the amount of one stabilized sodium-dithionite bleaching solution was 10% to 15% less than the homemade zinc hydrosulfite (100% assay basis). A similar report from the South Carolina paper mill indicated superiority to solutions prepared via a commercial bleaching system employing a solution of sodium borohydride and sodium hydroxide.

DESCRIPTION OF THE PREFERRED EMBODIMENTS

Following a methodical testing procedure, bleaching solutions were prepared according to various formulations planned for testing seven selected additives. The order of addition of the additives, when used in a formulation, to potable water was: a chelating agent, zinc dithionite, sodium tripolyphosphate, sodium phosphate, sodium metaborate, sodium carbonate, sodium hydroxide, and sodium dithionite. Samples for stability studies were stored in one-quart glass jars under a protective layer of mineral oil.

In was soon found that fines were initially present in solutions prepared from zinc-derived sodium dithionite; if these fines were removed by filtration immediately after preparing a solution, it remained clear for several days.

The methodical testing procedure broadly covered investigations into stabilizing of zinc-derived sodium dithionite and formate-derived sodium dithionite bleaching solutions. These investigations comprised:

1. stabilization testing of solutions having one to seven additives at various additive levels and at a cool storage temperature of 50° F. (10° C.) to identify those having satisfactory cool stability and to determine the need for chelating agents, coordination compounds, and alkalinity sources;
2. stabilization testing of selected cool-stable solutions at about ambient temperature (70°-75° F. or 21°-24° C.);
3. stabilization testing of selected formate-derived sodium dithionite solutions to determine the need for hydroxyl ions from NaOH, Na₂CO₃, Na₃PO₄, or Na₅P₃O₁₀;

4. bleach tests of selected cool-stable and ambient-stable solutions and of standard bleach solutions on a groundwood pulp at three bleaching levels; and
5. mill trials with selected solutions.

ZINC-DERIVED SODIUM DITHIONITE

EXAMPLES 1-23

As shown in Tables V and VI for Examples 1-19, a number of zinc-derived sodium dithionite bleaching solutions were storage-tested at 50° F. (10° C.) or at 70°-75° F. (21°-24° C.). Storage stability was obtained by using additives supplying a chelator, a source of zinc ion, a source of hydroxyl ion, and a complex former. In particular for investigating the effects of these additives, the zinc dithionite concentration was varied, zinc sulfate was alternatively used as a means of introducing the zinc ion, nitrilotriacetic acid trisodium salt monohydrate ($NTA.Na_3H_2O$) and ethylenediaminetetraacetic acid tetrasodium salt ($EDTA.Na_4$) were evaluated as chelating agents, and the amounts of sodium carbonate and sodium tripolyphosphate were varied in order to establish the most satisfactory solution. The benefits of a chelating agent were clearly demonstrated with a formulation prepared from sodium dithionite manufactured by the zinc reduction process, as there was heavy floc formation in the three solutions without the nitriolotriacetic acid salt (Examples 8, 9, and 13), whereas the solutions with a chelating agent had only a slight amount of fines in the zinc-derived sodium dithionite (Examples 1-7, 10-12, and 14-16). Solutions of Examples 17-19 were also adequately stable although no chelating agent or zinc ion was added, but the alkalinity of the solutions was somewhat high and undesirable turbidity was noted.

Although the preferred form of NTA is the monohydrated trisodium salt ($NTA.Na_3.H_2O$), the use of other forms of nitrilotriacetic acid (NTA), such as aqueous solutions thereof, is not excluded in the processes of this invention.

Other chelators that provide ligands for sequestration of metals, such as ethylenediaminetetraacetic acid (EDTA) are also useful, in the form of anhydrous salts, hydrates, or solutions, for making the storage-stabilized bleaching solutions of this invention.

TABLE V

| | Stabilized Solutions Based Upon Zinc-derived Sodium Dithionite (94.0% $Na_2S_2O_4$) Formulations with 13.83% $Na_2S_2O_4$* (Solution Basis, Wt.%) | | | | | | Initial Solution pH |
|---|---|---|---|---|---|---|---|
| Ex. No. | $ZnS_2O_4$ | $ZnSO_4.H_2O$ | NTA$^a$ | EDTA$^b$ | $Na_2CO_3$ | $Na_5P_3O_{10}$ | |
| 1 | 0.37 | — | — | 0.06 | 1.40 | 2.88 | N.A. |
| 2 | 0.37 | — | — | 0.06 | 1.40 | 2.88 | 9.8 |
| 3 | 0.18 | — | 0.47 | — | 1.29 | 2.70 | 9.9 |
| 4 | 0.18 | — | 0.47 | — | 1.29 | 2.70 | 9.9 |
| 5 | 0.18 | — | 0.47 | — | 1.29 | 2.70 | 9.9 |
| 6 | 0.18 | — | 0.47 | — | 2.58 | 1.40 | 10.5 |
| 7 | 0.18 | — | 0.47 | — | 2.58 | 1.40 | 10.5 |
| 8 | — | 0.26 | — | — | 2.51 | 1.84 | 9.9 |
| 9 | — | 0.52 | — | — | 2.25 | 1.84 | 9.7 |
| 10 | — | 0.26 | 0.37 | — | 2.14 | 1.84 | 10.0 |
| 11 | — | 0.17 | 0.92 | — | 2.60 | 0.92 | 10.2 |
| 12 | — | 0.17 | 0.47 | — | 3.06 | 0.92 | 10.3 |
| 13 | — | 0.17 | — | — | 3.52 | 0.92 | 10.2 |
| 14 | — | — | — | — | 3.69 | 0.92 | 10.1 |
| 15 | — | 0.26 | 0.37 | — | 2.14 | 1.84 | 10.0 |
| 16 | — | 0.17 | 0.47 | — | 3.06 | 0.92 | 10.4 |
| 17 | — | — | — | — | 3.69 | 0.92 | 10.9 |
| 18 | — | — | — | — | 2.76 | 1.84 | 10.6 |
| 19 | — | — | — | — | 2.76 | 1.84 | 10.6 |

*Commercial product basis; actual $Na_2S_2O_4$ is 13.00%.
$^a$as the trisodium salt monohydrate, $NTA.Na_3.H_2O$.
$^b$as the tetrasodium salt, $EDTA.Na_4$.

TABLE VI

| | Decomposition of the Stabilized Solutions of Table V During Storage Testing at Indicated Temperature %Decomposition of $Na_2S_2O_4$ | | | | | | |
|---|---|---|---|---|---|---|---|
| Ex. No. | Storage Temp. °F. | 2 Days | 3 Days | 5 Days | 7 Days | 11 Days | 12 Days |
| 1 | 50 | — | 0.0 | 0.0 | 0.7 | 0.6 | — |
| 2 | 50 | 0.0 | — | 0.8 | 0.9 | — | 1.2 |
| 3 | 50 | 1.3 | — | 2.2 | 2.3 | — | 3.6 |
| 4 | 50 | — | 1.7 | 1.9 | 4.5 | 4.4 | — |
| 5 | 70-75 | — | 2.0 | 3.6 | 23.1 | — | — |
| 6 | 70-75 | 2.2 | — | 1.5 | 4.7 | — | 30.9 |
| 7 | 50 | 0 | — | 0.4 | 1.1 | — | 1.2 |
| 8 | 70-75 | — | 2.9 | 4.3 | 27.7 | — | — |
| 9 | 70-75 | — | 2.9 | 12.1 | 75.4 | — | — |
| 10 | 70-75 | — | 1.7 | 3.5 | 8.5 | 86.9 | — |
| 11 | 70-75 | — | 0.5 | 2.2 | 6.1 | 82.8 | — |
| 12 | 70-75 | — | 1.1 | 2.2 | 5.0 | 66.8 | — |
| 13 | 70-75 | — | 1.3 | 4.1 | 8.9 | 81.7 | — |
| 14 | 70-75 | — | 1.1 | 2.0 | 4.4 | 42.4 | — |
| 15 | 50 | — | — | 0.1 | 0.2 | — | 0.3 |
| 16 | 50 | 2.2 | — | 1.6 | 1.8 | — | 2.4 |
| 17 | 50 | 1.4 | — | 1.1 | 1.5 | — | 1.7 |
| 18 | 70-75 | 1.0 | — | 1.8 | 3.8 | — | 27.0 |
| 19 | 50 | 0.8 | — | 0.6 | 1.3 | — | 0.8 |

Additional data illustrating the effects of the various additives on the stability of solutions derived from zinc-based sodium hydrosulfite is assembled in Table VII. For instance, in Example 22, wherein sodium tripolyphosphate and soda ash were omitted from Example 7, solution stability was extremely poor with 54.1% decomposition of the sodium dithionite after five days storage at 50° F. When the sodium tripolyphosphate was included (Example 20), solution stability increased to 31.3% decomposition per five days. Likewise, the addition of soda ash (Example 21) provided improved stabilization, indicated by 4.2% decomposition per five days. However, only by combining both additives was the desired degree of stabilization acquired, as observed in Example 7.

With further reference to Table VII, the solution of Example 3 (in which the sodium tripolyphosphate was increased from 1.4% in Example 7 to 2.7% and the sodium carbonate level decreased from 2.61% in Example 7 to 1.29%) was more stable than when either additive was used individually at the levels shown in Examples 20 and 21. Since sodium carbonate normally exerts a greater influence on solution stability, the excellent stability achieved in Example 3 was somewhat unexpected.

mercially available sodium dithionite blend but it did not quite meet the brightness gains attained with zinc dithionite. The solution of Example 7 was disappointing on this particular pulp.

On the basis of storage and bleaching data, the formulation for the solution of Example 3 was selected for field evaluation at a paper mill in South Carolina. The results from this mill trial indicated that the formulation was superior to sodium dithionite solutions prepared from sodium borohydride in a solution of sodium hydroxide.

TABLE VIII

Brightness Gain for Groundwood Pulp Bleached with Three Stabilized Sodium Dithionite Solutions and Two Bleaching Standards

| Ex. No. | Dithionite Bleaching Solutions | Brightness Gain at 130°F./2 Hrs. With x lbs. of Blend/Ton of Pulp | | |
|---|---|---|---|---|
| | | 5.0 Lbs. | 10.0 Lbs. | 20.0 Lbs. |
| 3 | See Table V | 5.7 | 7.3 | 8.3 |
| 15 | See Table V | 6.5 | 6.5 | 7.6 |
| 7 | See Table V | 3.8 | 5.9 | 6.8 |
| 24 | Commercially available dry blend of sodium hydrosulfite (Composition B, Bleaching Standard) | 3.0 | 5.3 | 7.3 |
| 25 | $ZnS_2O_4$ (Bleaching Standard) | 3.8 | 7.0 | 7.8 |

FORMATE-DERIVED SODIUM DITHIONITE

EXAMPLES 26-47 (INTERACTIONS OF SODIUM HYDROXIDE, SODIUM CARBONATE, AND SODIUM TRIPOLYPHOSPHATE)

Utilization of formate-derived sodium dithionite introduces extra acidity above that from zinc-derived sodium dithionite that must be compensated for with caustic soda. In order to optimize stability of solutions prepared with this product without having excessive free alkalinity present, a series of solutions containing two levels of concentration of soda ash with various treatment levels of caustic soda were prepared and stored at 50° F. As noted in Table IX, excellent solution

TABLE VII

Formulation and Decomposition in Anaerobic Storage at 50°F. (10°C.) of Stabilized Solutions Based Upon Zinc-derived Sodium Dithionite (94% minimum assay)

| Ex. No. | Formulations with 13.83% $Na_2S_2O_4$* (Solution Basis, Wt.%) | | | | | Initial pH at 75°F. | % Decomposition | | |
|---|---|---|---|---|---|---|---|---|---|
| | $NTA_a$ | $ZnS_2O_4$ | $Na_5P_3O_{10}$ | $EDTA_b$ | $Na_2CO_3$ | | 3 days | 5 days | 7 days |
| 7 | 0.47 | 0.18 | 1.40 | — | 2.61 | 10.5 | — | 0.4 | — |
| 20 | 0.47 | 0.18 | 1.40 | — | — | 9.2 | 7.3 | 31.3 | — |
| 21 | 0.47 | 0.18 | — | — | 2.61 | 10.8 | 0.7 | 4.2 | 2.4 |
| 22 | 0.47 | 0.18 | — | — | — | 8.6 | 17.3 | 54.1 | — |
| 3 | 0.47 | 0.18 | 2.70 | — | 1.29 | 9.9 | — | 2.2 | 2.3 |
| 1 | — | 0.37 | 2.88 | 0.06 | 1.40 | N.A. | 0.0 | 0.0 | 0.7 |
| 23 | — | 0.37 | 2.88 | — | 1.40 | 10.7 | 1.0 | 2.2 | 2.6 |

*Commercial product basis; actual $Na_2S_2O_4$ is 13.00%
$a$ as the trisodium salt monohydrate, $NTA \cdot Na_3 \cdot H_2O$.
$b$ as the tetrasodium salt, $EDTA \cdot Na_4$.

On the basis of solution stabilities for formulations of Examples 3, 15, and 7, these solutions were chosen for groundwood pulp bleaching studies. Each solution was comparably used for bleaching a groundwood pulp against standards of zinc dithionite and a commercially available, dry sodium dithionite blend (Composition B). The data show that the formulation producing the solution of Example 3 produced brightness gains exceeding both standards. The solution of Example 15, which is somewhat similar to make-up to Example 3, was also equivalent to, or slightly better than, the comstability was obtained when 1% sodium hydroxide ($Na_2S_2O_4$ basis) was added to the test formulation containing, among other additives, 2.49% $Na_2CO_3$ and 14.44% formate-derived sodium dithionite on a solution basis (Example 27). Likewise, comparable stability was obtained with 2.6% NaOH with the $Na_2CO_3$ concentration being lowered to 1.29% and the sodium tripolyphosphate concentration being almost tripled, as demonstrated in Example 32 in Table IX and Example 40 in Table X.

TABLE IX

Stabilized Solutions Based Upon Formate-derived Sodium Dithionite (90% minimum assay) and Decomposition Thereof in Anaerobic Storage

| | Formulations with 14.44% $Na_2S_2O_4$, 0.47% NTA. $Na_3.H_2O$ & 0.21% $ZnS_2O_4$ (Solution Basis Wt.%) | | NaOH, % ($Na_2S_2O_4$ Basis) | Initial pH | % Decomposition at 50°F. | | |
|---|---|---|---|---|---|---|---|
| Ex. No. | $Na_5P_3O_{10}$ | $Na_2CO_3$ | | | 5 Days | 7 Days | 12 Days |
| 26 | 0.92 | 2.49 | 0.0 | 10.0 | 3.4 | 5.2 | 16.5 |
| 27 | 0.92 | 2.49 | 1.0 | 10.1 | 0.4 | 2.4 | 7.5 |
| 28 | 0.92 | 2.49 | 1.5 | 10.3 | 0.5 | 0.3 | 7.4 |
| 29 | 0.92 | 2.49 | 2.0 | 10.5 | 0.1 | 3.5 | 6.9 |
| 30 | 2.67 | 1.29 | 0.0 | 9.2 | 11.7 | 34.3 | 84.0 |
| 31 | 2.67 | 1.29 | 2.0 | 9.9 | 2.9 | — | 63.7 |
| 32 | 2.67 | 1.29 | 2.6 | 10.3 | 0.4 | 2.3 | 7.9 |
| 33 | 2.67 | 1.29 | 3.2 | 10.8 | 0.4 | 1.8 | 4.8 |
| 34 | 2.67 | 1.29 | 3.9 | 12.0 | 0.5 | 2.9 | 4.4 |

TABLE X

Stabilized Solutions Based Upon Formate-derived Sodium Dithionite (90% minimum assay) and Decomposition Thereof in Anaerobic Storage

| | Formulations with 14.44% $Na_2S_2O_4$, 0.47% NTA. $Na_3.H_2O$ & 0.21% $ZnS_2O_4$ (Solution Basis Wt.%) | | NaOH % ($Na_2S_2O_4$ Basis) | Initial pH | %Decomposition at 50°F. | | |
|---|---|---|---|---|---|---|---|
| Ex. No. | $Na_5P_3O_{10}$ | $Na_2CO_3$ | | | 5 Days | 8 Days | 12 Days |
| 35 | 0.0 | 3.41 | — | 10.1 | 3.9 | 7.6 | 17.3 |
| 36 | 0.46 | 2.94 | — | 10.0 | 4.2 | 9.2 | 28.1 |
| 37 | 0.92 | 2.49 | — | 9.9 | 5.1 | 15.1 | 73.0 |
| 38 | 0.92 | 2.49 | 1.0 | 10.0 | 2.4 | 6.9 | 17.6 |
| 39 | 2.67 | 1.29 | 2.0 | 9.8 | 2.7 | 15.3 | 78.8 |
| 40 | 2.67 | 1.29 | 2.6 | 10.1 | 1.4 | 6.7 | 24.2 |

In a series of storage tests which are assembled in Table XI with 14.44% formate-derived sodium hydrosulfite, 0.47% nitrilotriacetic acid trisodium salt monohydrate, and 0.18% zinc dithionite, the effects on solution stability of caustic soda, sodium carbonate and sodium tripolyphosphate are investigated further. Herein, the addition of 0.34% NaOH on a solution basis was found to be inadequate for acceptable solution stabilization as losses exceeded 40.0% within three days (Example 43). By combining 1.3% soda ash with the 0.34% caustic soda, stability of the stored solution increased to 4.7% decomposition of the sodium hydrosulfite after five days (Example 41). This trend towards increased stability continues through the addition of another alkaline agent, sodium tripolyphosphate, and upon combining each of the alkaline ingredients, solution decomposition dropped to only 1.4% after 5 days (Example 40). Removal of the caustic soda from this solution caused a significant increase in losses of from 1.4% to 9.1% after five days. Similar effects were evident in test formulations for Examples 44, 38, 45, and 26, where different concentration ranges were examined.

Evidence for the importance of sodium tripolyphosphate was further strengthened through bleaching studies with solutions containing different weight ratios of sodium tripolyphosphate to soda ash as present in Table XII. Here, there were no significant differences in solution stability but there was a definite trend toward increased brightness gains as the sodium tripolyphosphate concentration was increased from 0 to 2.67% (solution basis) in the formulation. Therefore, with solution stability comparable and bleaching ability enhanced by increasing the sodium tripolyphosphate content, the order of preference for large-scale use of these formulations is Examples 40, 38, and 35.

TABLE XI

Stabilized Solutions Based Upon Formate-derived Sodium Dithionite (90% minimum assay) and Decomposition Thereof in Anaerobic Storage at 50°F (10°C)

| | Formulations with 14.44% $Na_2S_2O_4$, 0.47% NTA. $Na_3.H_2O$, and 0.18% $ZnS_2O_4$ (Solution Basis. Wt.%) | | | Initial pH at 75°F. | % Decomposition at 50°F. | | |
|---|---|---|---|---|---|---|---|
| Ex. No. | $Na_5P_3O_{10}$ | $Na_2CO_3$ | NaOH | | 3 Days | 5 Days | 7 Days |
| 41 | — | 1.3 | 0.34 | 10.2 | 0.0 | 4.7 | 9.2 |
| 40 | 2.7 | 1.3 | 0.34 | 10.2 | — | 1.4 | — |
| 42 | 2.7 | 1.3 | — | 9.5 | 2.7 | 9.1 | 12.1 |
| 43 | — | — | 0.34 | 7.2 | 41.3 | — | — |
| 44 | 0.92 | — | 0.13 | 6.9 | 56.3 | — | — |
| 38 | 0.92 | 2.49 | 0.13 | 10.0 | — | 2.4 | — |
| 45 | — | 2.49 | — | 9.1 | 7.4 | 8.0 | 10.8 |
| 26 | 0.92 | 2.49 | — | 10.0 | — | 3.4 | 5.2 |

TABLE XII

Stabilized Solutions Based Upon Formate-derived Sodium Dithionite (90% minimum assay), Decomposition Thereof in Anaerobic Storage and Brightness Gains for a Groundwood Pulp Bleached Therewith and With Two Standards

| Ex. No. | Formulations with 14.44% $Na_2S_2O_4$, 0.47% NTA. $Na_3.H_2O$ and 0.21% $ZnS_2O_4$ (solution Basis, Weight %) | | | Initial pH | % Decomposition at 50°F. | | Brightness Gain at 130°F./2 Hrs. With x lbs. of Blend/Ton of Pulp | | |
|---|---|---|---|---|---|---|---|---|---|
| | $Na_5P_3O_{10}$ | $Na_2CO_3$ | NaOH | | 5 Days | 12 Days | 5.0 Lbs | 10.0 Lbs | 20.0 Lbs |
| 35 | 0.0 | 3.41 | — | 10.1 | 3.9 | — | 4.7 | 6.7 | 8.2 |
| 38 | 0.92 | 2.49 | 0.13 | 10.0 | 2.4 | — | 5.3 | 7.0 | 8.4 |
| 27 | 0.92 | 2.49 | 0.13 | 10.1 | 0.4 | 7.5 | 5.2 | 7.4 | 8.3 |
| 40 | 2.67 | 1.29 | 0.34 | 10.1 | 1.4 | — | 5.3 | 7.9 | 9.4 |
| 32 | 2.67 | 1.29 | 0.34 | 10.3 | 0.4 | 7.9 | 5.0 | 7.5 | 8.4 |
| 46 | Commercially available dry blend of sodium dithionite (Composition B, Bleaching Standard)[a] | | | | | | 5.4 | 7.6 | 8.9 |
| 47 | Commercially available dry blend of sodium dithionite (Composition B, Bleaching Standard)[b] | | | | | | 4.2 | 7.2 | 9.3 |

[a]Standard for comparison with Examples 27 and 32.
[b]Standard for comparison with Examples 35, 38, and 40.

EXAMPLES 48-72 (SODIUM HYDROXIDE-SODIUM PHOSPHATE INTERACTIONS)

Because sodium tripolyphosphate reverts to the orthoposphate with time, sodium phosphate, with its readily available alkalinity, appears as a likely replacement for the tripolyphosphate. In addition, the alkalinity of the sodium phosphate presents an excellent opportunity for eliminating caustic soda from formate-sodium hydrosulfite based formulations.

At 50° F., as shown in Tables XIII and XIV by Examples 50 and 52, the presence of 0.92% sodium phosphate stabilizes a formate-derived sodium dithionite solution at a level equivalent to 0.34% NaOH. Soda ash at 2.49% significantly improved the stability, but without caustic soda it was not until sodium phosphate and sodium carbonate were used in combination that an acceptable stability of 1.7% decomposition after seven days was attained in Example 51. Only slightly better stability, 1.2% decomposition per seven days, was demonstrated by Example 60 in Tables XV and XVI when caustic soda was present.

The use of sodium phosphate as a replacement for caustic soda and sodium tripolyphosphate was further researched at 70°–75° F., a temperature more suited for industrial applications because of the elimination of refrigeration for storage. Results of this phase of the investigation are assembled in Tables XIII-XVII. In Examples 55-57 at the 4% concentration level, sodium phosphate gave marginal stability to the solution at 75° F., but of greater significance was the formation of a black floc, as noted in Example 56. The black floc was not noted, however, when zinc dithionite and nitrilotriacetic acid trisodium salt were included in the formulation and moreover, solution stability was slightly better as shown by Example 68.

Also shown in Tables XII-XVIII are other formulations such as Example 59 which have possible industrial applications. Bleaching results in Table XVIII with Examples 59 and 68 were found to be comparable to the bleaching standard based on zinc-derived sodium dithionite of Examples 3, 69, and 77 in Tables V, VI, VIII, XIII, XIV, XXI, and XXII, which was the very successful formulation field-tested initially at a South Carolina paper mill. Of the two newer formulations, Example 68 is preferable because it appears to be slightly more stable. However, one should not hesitate in using the formulation of Example 59 if soda ash were more readily available than sodium phosphate.

EXAMPLES 75 and 76 (ZINC ION AND CHELATOR)

Examples 75 and 76 in Table XIX and XX demonstrate the importance of the zinc ion and the chelating agent. Without the two additives in question the decomposition tripled after five days at 50° F.

EXAMPLES 69-79 (BORATE ION)

In Tables XIX-XXII, sodium metaborate is substituted for sodium phosphate. Ambient decomposition tests results and brightness gains in Tables XX and XXII show good stability, as compared to Examples 8-14 in Table VI, Examples 53-59 in Table XIV Examples 66-68 in Table XVI, and Examples 69-71 in Table XVII. (18) Choices between the sodium metaborate and the sodium phosphate formulations can consequently be based entirely on raw materials availability, cost, and possible pollution problems that might be encountered through the use of either phosphate or boron because both provide adequate storage stability and bleaching effectiveness.

TABLE XIII

Stabilized Solutions Based Upon Formate-derived Sodium Dithionite (90% minimum assay)

| Ex. No. | Formulations with 14.44% $Na_2S_2O_4$ (Solution Basis, Weight %) | | | | | Initial pH at 75°F. |
|---|---|---|---|---|---|---|
| | $NTA.Na_3.H_2O$ | $ZnS_2O_4$ | $Na_3PO_4$ | $Na_2CO_3$ | NaOH | |
| 48 | 0.47 | 0.18 | — | — | — | 6.0 |
| 49 | 0.47 | 0.18 | — | 2.49 | — | 9.7 |
| 50 | 0.47 | 0.18 | 0.92 | — | — | 7.0 |
| 51 | 0.47 | 0.18 | 0.92 | 2.49 | — | 10.0 |
| 52 | 0.47 | 0.18 | — | — | 0.32 | 7.2 |
| 53 | 0.47 | 0.18 | — | — | — | 6.0 |
| 54 | 0.47 | 0.18 | — | 1.29 | — | 8.5 |
| 55 | 0.47 | 0.18 | 4.0 | — | — | 10.8 |
| 56 | — | — | 4.0 | — | — | 11.1 |

TABLE XIII-continued

Stabilized Solutions Based Upon Formate-derived Sodium Dithionite (90% minimum assay)

| Ex. No. | Formulations with 14.44% $Na_2S_2O_4$ (Solution Basis, Weight %) | | | | | Initial pH at 75°F. |
|---|---|---|---|---|---|---|
| | $NTA.Na_3.H_2O$ | $ZnS_2O_4$ | $Na_3PO_4$ | $Na_2CO_3$ | NaOH | |
| 57 | 0.47 | — | 4.0 | — | — | 11.1 |
| 58 | 0.47 | 0.18 | — | — | 0.34 | 7.2 |
| 59 | 0.47 | 0.18 | 2.67 | 1.29 | — | 10.5 |

TABLE XIV

Decomposition of the Stabilized Solutions of Table XIII During Anaerobic Storage at Indicated Temperatures

| Ex. No. | Storage Temp.,°F. | % Decomposition | | | |
|---|---|---|---|---|---|
| | | 3 Days | 5 Days | 7 Days | 12 Days |
| 48 | 50 | 65.4 | — | — | — |
| 49 | 50 | 7.4 | 8.0 | 10.8 | 17.2 |
| 50 | 50 | 44.9 | — | — | — |
| 51 | 50 | — | 1.2 | 1.7 | 8.9 |
| 52 | 50 | 41.3 | — | — | — |
| 53 | 75 | 87.5 | — | — | — |
| 54 | 75 | 86.1 | — | — | — |
| 55 | 75 | — | 3.5 | 5.1 | 30.7 |
| 56 | 75 | 3.5* | 4.6 | 7.9 | 87.5 |
| 57 | 75 | 3.1 | 4.3 | 6.2 | 85.6 |
| 58 | 75 | 87.2 | — | — | — |
| 59 | 75 | — | 3.3 | 5.8 | 80.0 |

*Black precipitate noted within 24 hours.

TABLE XV

Stabilized Solutions Based Upon Formate-derived Sodium Dithionite

| Ex. No. | Formulations with 14.44% $Na_2S_2O_4$, 0.47% $NTA.Na_3.H_2O$ and 0.18% NTA (Solution Basis,Wt. %) | | | | Initial pH | Storage Temp.,°F. |
|---|---|---|---|---|---|---|
| | $Na_5P_3O_{10}$ | $Na_3PO_4$ | $Na_2CO_3$ | NaOH | | |
| 32 | 2.6 | — | 1.29 | 0.34 | 10.3 | 50 |
| 27 | 0.92 | — | 2.49 | 0.13 | 10.1 | 50 |
| 51 | — | 0.92 | 2.49 | — | 10.0 | 50 |
| 60 | — | 0.92 | 2.49 | 0.13 | 10.2 | 50 |
| 61 | 0.92 | 1.74 | 1.29 | 0.34 | 11.2 | 50 |
| 62 | — | 2.67 | 1.29 | 0.34 | 11.4 | 50 |
| 63 | Commercially available dry blend of sodium dithionite (Composition B, Bleaching Standard) | | | | | |
| 64 | 0.92 | 1.74 | 1.29 | — | 10.1 | 50 |
| 65 | 1.33 | 1.33 | 1.29 | — | 9.8 | 50 |
| 66 | 0.92 | 1.74 | 1.29 | — | 10.0 | 70–75 |
| 67 | 1.33 | 1.33 | 1.29 | — | 9.7 | 70–75 |
| 68 | — | 4.00 | — | — | 10.8 | 70–75 |
| 59 | — | 2.67 | 1.29 | — | 10.5 | 70–75 |

TABLE XVI

Decomposition of the Solutions of Table XV During Anaerobic Storage Thereof at Indicated Temperatures and Brightness Gains of a Groundwood Pulp Bleached Therewith

| Ex. No. | % Decomposition | | | | Brightness Gain at 120 °F./2 Hours With x Lbs. of Blend/Ton of Pulp | | |
|---|---|---|---|---|---|---|---|
| | 5 Days | 7 Days | 9 Days | 12 Days | 5.0 Lbs | 10.0 Lbs | 20.0 Lbs |
| 32 | 0.4 | 2.3 | — | 7.9 | — | — | — |
| 27 | 0.4 | 2.4 | — | 7.5 | — | — | — |
| 51 | 1.2 | 1.7 | — | 8.9 | 3.8 | 6.0 | 8.5 |
| 60 | 0.9 | 1.2 | — | 5.8 | — | — | — |
| 61 | 0.4 | 0.7 | — | 4.6 | — | — | — |
| 62 | 0.4 | 0.7 | — | 4.1 | — | — | — |
| 63 | Commercially available dry blend of sodium dithionite, (Composition B, Bleaching Standard) | | | | 2.5 | 4.6 | 6.9 |
| 64 | 0.1 | 0.9 | — | 2.2 | — | — | — |
| 65 | 0.2 | 1.0 | — | 4.3 | — | — | — |
| 66 | 7.3 | 39.4 | — | — | — | — | — |
| 67 | 51.8 | — | — | — | — | — | — |
| 68 | 3.5 | 5.1 | 7.8 | 30.7 | — | — | — |
| 59 | 3.3 | 5.8 | 11.8 | 80.0 | — | — | — |

TABLE XVII

Stabilized Bleaching Solutions

| Ex. No. | Formulations with 0.47% $NTA.Na_3.H_2O$ and 0.18% $ZnS_2O_4$ (Solution Basis, Wt. %) | | | | Initial pH at Room Temp. |
|---|---|---|---|---|---|
| | $Na_2S_2O_4$ | $Na_3PO_4$ | $Na_2CO_3$ | $Na_5P_3O_{10}$ | |
| 69 | 13.83$^a$ | — | 1.29 | 2.70 | 9.9 |

TABLE XXII

Decomposition of the Solutions of Table XXI During Ambient Anaerobic Storage and Brightness Gains of a Groundwood Pulp Bleached Therewith

| Ex. No. | % Decomposition 70–75°F. | | Brightness Gain at 120°F./2 Hrs. With x lbs. of Blend/Ton of Pulp[a] | | |
|---|---|---|---|---|---|
| | 5 Days | 10 Days | 5.0 lbs. | 10.0 lbs. | 20.0 lbs. |
| 77 | — | — | 2.8 | 6.3 | 8.4 |
| 78 | 6.7 | 38.0 | 3.6 | 6.3 | 7.2 |
| 71 | 4.9 | 8.1 | 3.4 | 5.4 | 7.2 |
| 79 | 5.2 | 11.5 | 4.0 | 7.0 | 8.3 |

[a]Unbleached groundwood from South Carolina papermill.

Upon examining the formulations of the successful examples, it is noteworthy that, in addition to sodium dithionite, only one (Example 57) contains two additives and only five (Examples 15, 21, 23, 35, 55) contain three additives. All others have at least four in addition to sodium dithionite.

It is apparent that the anaerobic storage stability of an aqueous sodium dithionite bleaching solution is sensitive to the relative proportions and interactions of a chelating agent, a source of zinc ion, and a complex former (e.g., Examples 9, 10, 13 compared to Examples 10–12 and 14) and that it is also critically dependent upon the source, quantities, and interactions of the complex former and the source of hydroxyl ion in ways that are not readily understood or predictable.

Because it will be readily apparent to those skilled in the bleaching art that innumerable variations, modifications, applications, and extensions of the discoveries hereinbefore disclosed can be made without departing from the spirit and scope of the invention, what is herein defined by such scope and is desired to be protected should be measured, and the invention should be limited, only by the following claims.

What is claimed is:

1. A storage-stabilized aqueous sodium dithionite bleaching solution, comprising:
   A. A chelating agent which is selected from the group consisting of ethylenediaminetetraacetic acid tetrasodium salt and nitrilotriacetic acid trisodium salt, said nitrilotriacetic acid trisodium salt being at a concentration in said solution of 0.3–1.0% by weight;
   B. a source of zinc ion which is selected from the group consisting of zinc sulfate and zinc dithionite at a concentration in said solution of 0.1–0.5% by weight;
   C. a complex former which comprises sodium tripolyphosphate at a concentration of 0.6–3.0% by weight;
   D. a source of hydroxyl ion which comprises sodium carbonate at a concentration in said solution of 1.0–4.0% by weight; and
   E. sodium dithionite at a concentration by weight of at least 12%, said sodium dithionite being zinc derived.

2. The method of preparing said solution of claim 1, wherein the order of addition to potable water is as follows:
   A. said nitriolotriacetic acid trisodium salt;
   B. said zinc dithionite;
   C. said sodium tripolyphosphate;
   D. said sodium carbonate; and
   E. said zinc-derived sodium dithionite.

3. A storage-stabilized sodium dithionite bleaching solution, having a pH of 9.5–10.5 and characterized by substantially no floc, or fines, comprising:
   A. a complex former comprising sodium tripolyphosphate at a concentration of 0.6–3.0% by weight;
   B. sodium carbonate at a concentration in said solution of 1.0–4.0% by weight; and
   C. zinc-derived sodium dithionite at a concentration of at least 12% by weight.

4. A storage-stabilized aqueous sodium dithionite bleaching solution, comprising:
   A. a chelating agent which is nitrilotriacetic acid trisodium salt at a concentration of 0.5% by weight of said solution;
   B. a source of zinc ion which is zinc dithionite at a concentration by weight of about 0.2% by weight of said solution;
   C. a complex former which is selected from the group consisting of sodium tripolyphosphate and sodium phosphate, said sodium tripolyphosphate being at a concentration of at least 0.9% by weight of said solution;
   D. a source of hydroxyl ion which is selected from the group consisting of sodium carbonate and sodium hydroxide and comprises a combination of said sodium carbonate at a concentration of at least 1.0% by weight of said solution and said sodium hydroxide at a concentration of at least 0.1% by weight of said solution; and
   E. sodium dithionite at a concentration by weight of at least 12%, said sodium dithionite being formate-derived.

5. A storage stabilized aqueous bleaching solution that undergoes less than 5% decomposition during anaerobic storage for 5 days at 50° F and is substantially free of fines, floc, and turbidity, said solution being based on sodium dithionite and comprising at least two additives selected from the group consisting of a chelator, a source of soluble zinc ion, a complex former, and a source of hydroxylation, wherein:
   A. said sodium dithionite is at a concentration of at least 12% by weight of said solution;
   B. said source of soluble zinc ion is zinc dithionite at a concentration of at least about 0.2% by weight of said solution; and
   C. said chelator is selected from the group consisting of ethylenediaminetetraacetic acid tetrasodium salt and nitrilotriacetic acid trisodium salt.

6. The solution of claim 5 wherein:
   A. said nitrilotriacetic acid trisodium salt is at a concentration of about 0.4% by weight of said solution;
   B. said complex former is sodium tripolyphosphate at a concentration of about 3% by weight of said solution;

TABLE XVII-continued

Stabilized Bleaching Solutions

| Ex. No. | Formulations with 0.47% NTA.Na₃.H₂O and 0.18% ZnSO₄ (Solution Basis, Wt. %) | | | | Initial pH at Room Temp. |
|---|---|---|---|---|---|
| | $Na_2S_2O_4$ | $Na_3PO_4$ | $Na_2CO_3$ | $Na_5P_3O_{10}$ | |
| 70 | 14.44$^b$ | 4.00 | — | — | 10.83 |
| 71 | 14.44$^c$ | 2.67 | 1.29 | — | 10.49 |
| 72 | Commercially available dry blend of sodium hydrosulfite (Composition B, Bleaching Standard) | | | | |

$^a$Zinc-derived sodium dithionite, 94% minimum assay (same formulation as Example 3).
$^b$Formate-derived sodium dithionite, 90% minimum assay (same formulation as Example 68).
$^c$Formate-derived sodium dithionite, 90% minimum assay (same formulation as Example 59).

TABLE XVIII

Decomposition of the Solutions of Table XVII during Anaerobic Storage Thereof and Brightness Gain of a Groundwood Pulp Bleached Therewith

| Ex. No. | % Decomposition 70–75°F. | | Brightness Gain at 120°F./2Hrs. With x lbs. of Blend/Ton of Pulp | | |
|---|---|---|---|---|---|
| | 5 Days | 9 Days | 5.0 lbs. | 10.0 lbs. | 20.0 lbs. |
| 69 | — | — | 5.2 | 6.8 | 9.1 |
| 70 | 3.5 | 7.8 | 5.0 | 7.6 | 8.6 |
| 71 | 3.3 | 32.7 | 4.9 | 8.6 | 8.9 |
| 72 | Commercially available dry blend of sodium hydrosulfite (Composition B, Bleaching Standard) | | 4.6 | 7.6 | 9.6 |

TABLE XIX

Stabilized Solutions Based Upon Formate-derived Sodium Dithionite

| Ex. No. | Formulations with 14.44% $Na_2S_2O_4$ (Solution Basis, Wt. %) | | | | | | Initial pH at 75°F. |
|---|---|---|---|---|---|---|---|
| | NTA.Na₃.H₂O | ZnSO₄ | $Na_5P_3O_{10}$ | $Na_2B_2O_4$ | $Na_2CO_3$ | NaOH | |
| 29 | 0.47 | 0.18 | 0.92 | — | 2.49 | 0.26 | 10.5 |
| 73 | 0.47 | 0.18 | 0.92 | — | — | 0.26 | 7.2 |
| 32 | 0.47 | 0.18 | 2.7 | — | 1.3 | 0.34 | 10.3 |
| 52 | 0.47 | 0.18 | — | — | — | 0.34 | 7.2 |
| 58 | 0.47 | 0.18 | — | — | — | 0.34 | 7.2 |
| 74 | 0.47 | 0.18 | — | 4.0 | — | 0.34 | 10.35 |
| 75 | 0.47 | 0.18 | 1.6 | — | 1.86 | — | 9.5 |
| 76 | — | — | 1.6 | — | 1.86 | — | 9.5 |

TABLE XX

Decomposition of the Solutions of Table XIX During Anaerobic Storage at Indicated Temperatures and Brightness Gain of a Groundwood Pulp Bleached Therewith

| Ex. No. | Storage Temp., °F. | % Decomposition | | | |
|---|---|---|---|---|---|
| | | 3 Days | 5 days | 7 Days | 12 Days |
| 29 | 50 | — | 0.1 | 3.5 | 6.9 |
| 73 | 50 | 50.0 | — | — | — |
| 32 | 50 | — | 0.2 | — | 7.9 |
| 52 | 50 | 41.3 | — | — | — |
| 58 | 75 | 87.2 | — | — | — |
| 74 | 75 | — | 4.9 | — | — |
| 75 | 50 | 1.4 | 4.5 | 11.3 | — |
| 76 | 50 | 5.4 | 14.7 | 34.0 | — |

TABLE XXI

Stabilized Solutions Having Sodium Metaborate as Additive

| Ex. No. | Formulations with 0.47% NTA.Na₃.H₂O and 0.18% ZnSO₄ (Solution Basis, Weight %) | | | | | Initial pH at 70–75°F. |
|---|---|---|---|---|---|---|
| | $Na_2S_2O_4$ | $Na_5P_3O_{10}$ | $Na_2CO_3$ | $Na_2B_2O_4$ | NaOH | |
| 77 | 13.83$^a$ | 2.70 | 1.29 | — | — | 9.9 |
| 78 | 14.44$^b$ | 0.92 | 1.29 | 1.76 | 0.34 | 10.25 |
| 71 | 14.44$^b$ | — | — | 4.00 | 0.34 | 10.35 |
| 79 | 14.44$^b$ | — | 1.29 | 2.69 | 0.34 | 10.35 |

$^a$Zinc-derived $Na_2S_2O_4$ with 94% minimum assay, 13.00% actual $Na_2S_2O_4$.
$^b$Formate-derived $Na_2S_2O_4$ with 90% minimum assay, 13.00% actual $Na_2S_2O_4$.

C. said source of hydroxyl ion comprises sodium carbonate at a concentration of about 1% by weight of said solution; and D. the pH of said solution is about 10.

7. The solution of claim 6 wherein said sodium dithionite is zinc derived and said storage stabilized aqueous bleaching solution undergoes decomposition of approximately 3½% after 12 days storage at 50° F. (10° C).

8. The solution of claim 5 wherein:
   A. said ethylenediaminetetraacetic acid tetrasodium salt is at a concentration of approximately 0.06%;
   B. said complex former is sodium tripolyphosphate at a concentration of approximately 3% by weight;
   C. said source of hydroxyl ion comprises said sodium tripolyphosphate and sodium carbonate at a concentration of approximately 1½% by weight; and
   D. said sodium dithionite is zinc derived, and wherein said storage stabilized aqueous bleaching solution undergoes decomposition of approximately 1% in 12 days of anaerobic storage at 50° F.

9. The storage-stabilized sodium dithionite bleaching solution of claim 8, which is substantially free of turbidity and additionally comprises a source of soluble zinc ion selected from the group consisting of zinc sulfate and zinc dithionite at a concentration in said storage-stabilized sodium dithionite bleaching solution of 0.1–0.5% by weight and a chelating agent selected from the group consisting of ethylenediaminetetraacetic acid, ethylenediaminetetraacetic acid tetrasodium salt, nitrilotriacetic acid, and nitrilotriacetic acid trisodium salt.

10. The storage-stabilized sodium dithionite bleaching solution of claim 9, wherein said ethylenediaminetetraacetic acid tetrasodium salt is at a concentration of approximately 0.06% by weight.

11. The storage stabilized sodium dithionite bleaching solution of claim 10, wherein said nitrilotriacetic acid trisodium salt is at a concentration in said solution of approximately 0.3–1.0% by weight.

12. The solution of claim 5, wherein:
   A. said nitrilotriacetic acid trisodium salt is at a concentration of about 0.5% by weight of said solution;
   B. said source of hydroxyl ion and said complex former are sodium phosphate at a concentration of about 4% by weight of said solution; and
   C. said sodium dithionite is:
      1. formate derived and
      2. at a concentration of about 14½% by weight of said solution; and
   wherein said storage stabilized aqueous bleaching solution undergoes decomposition of approximately 3.5% in five days and 5% in 7 days of anaerobic storage at 70°–75° F. (21-24° C).

13. The solution of claim 5 wherein:
   A. said nitrilotriacetic acid trisodium salt is at a concentration of about 0.5% by weight of said solution;
   B. said complex former is sodium phosphate at a concentration of about 2⅔% by weight of said solution;
   C. said source of hydroxyl ion comprises said sodium phosphate and sodium carbonate at a weight concentration of about 1¼% by weight of said solution; and
   D. said sodium dithionite is:
      1. formate derived and
      2. at a concentration of about 14½% by weight of said solution and wherein said storage stabilized aqueous bleaching solution undergoes decomposition of approximately 3% in five days of anaerobic storage at 70°–75° F. (21°–24° C).

14. The solution of claim 5 wherein:
   A. said nitrilotriacetic acid trisodium salt is at a concentration of about 0.5% by weight of said solution;
   B. said complex former is sodium metaborate at a concentration of 4% by weight of said solution;
   C. said source of hydroxyl ion comprises said sodium metaborate and sodium hyroxide at a concentration of about 0.3% by weight of said solution; and
   D. said sodium dithionite is:
      1. formate derived and
      2. at a concentration of about 13% by weight of said solution; and
   wherein said storage stabilized aqueous bleaching solution undergoes approximately 5% decomposition in five days of anaerobic storage at 70°–75° F. (21°–24° C.)

15. The solution of claim 5 wherein:
   A. said nitrilotriacetic acid trisodium salt is at a concentration of about 0.5% by weight of said solution;
   B. said complex former is sodium metaborate at a concentration of about 2⅔% by weight of said solution;
   C. said source of hydroxyl ion is;
      1. said sodium metaborate,
      2. sodium carbonate at a concentration of about 1¼% by weight of said solution, and
      3. sodium hydroxide at a concentration of about ⅛% by weight of said solution; and
   D. said sodium dithionite is:
      1. formate derived and
      2. at a concentration of about 13% by weight of said solution; and
   wherein said storage stabilized aqueous sodium dithionite undergoes approximately 5% decomposition in 5 days and approximately 11½% decomposition in 10 days of anaerobic storage at 70°–75° F. (21°–24° C).

* * * * *